United States Patent [19]

Payne

[11] 4,334,147
[45] Jun. 8, 1982

[54] POWER CONTROL FOR APPLIANCE USING HIGH INRUSH CURRENT ELEMENT

[75] Inventor: Thomas R. Payne, Louisville, Ky.

[73] Assignee: General Electric Company, Louisville, Ky.

[21] Appl. No.: 8,376

[22] Filed: Feb. 1, 1979

[51] Int. Cl.³ .............................................. H05B 1/02
[52] U.S. Cl. .................................. 219/497; 219/492;
219/485; 219/486; 219/509; 323/235; 323/238; 340/146.3 Z; 307/38; 307/40
[58] Field of Search .............. 219/492, 490, 485, 497, 219/483, 501, 486; 323/18, 24, 22, 235, 238; 307/252 VA, 38-41; 363/37; 340/337, 146.3 Z

[56] References Cited

U.S. PATENT DOCUMENTS

| | | | |
|---|---|---|---|
| 3,541,429 | 11/1970 | Martin | 219/492 |
| 3,878,358 | 4/1975 | Barton et al. | 219/497 |
| 3,912,905 | 10/1975 | Giler | 219/464 |
| 3,944,790 | 3/1976 | Tamano et al. | 219/492 |
| 4,029,937 | 6/1977 | Russell . | |
| 4,046,991 | 9/1977 | Sefton et al. | 219/497 |
| 4,086,466 | 4/1978 | Scharlack | 219/501 |
| 4,104,715 | 8/1978 | Lawson, Jr. | 363/37 |
| 4,135,122 | 1/1979 | Holmquist et al. | 219/492 |

OTHER PUBLICATIONS

Inspec-"Single-Chip Microprocessor Rules the Roast", Electronics, vol. 49, No. 25, pp. 105-110, 12/9/1976.

Primary Examiner—Arthur T. Grimley
Assistant Examiner—M. Paschall
Attorney, Agent, or Firm—H. Neil Houser; Radford M. Reams

[57] ABSTRACT

A power control arrangement for controlling the power output of a resistive heating element of the type having a fast thermal response time and a highly variable resistance with temperature. The power control arrangement includes a plurality of operator selectable power settings and an electronic switching system responsive to operator selection of these settings to rapidly couple and decouple a power supply to the element. The switching action is selected to permit rapid heat up of the element without causing an unacceptable current to flow and to prevent excessive cooling of the element after it reaches operating temperatures during steady state operation.

13 Claims, 19 Drawing Figures

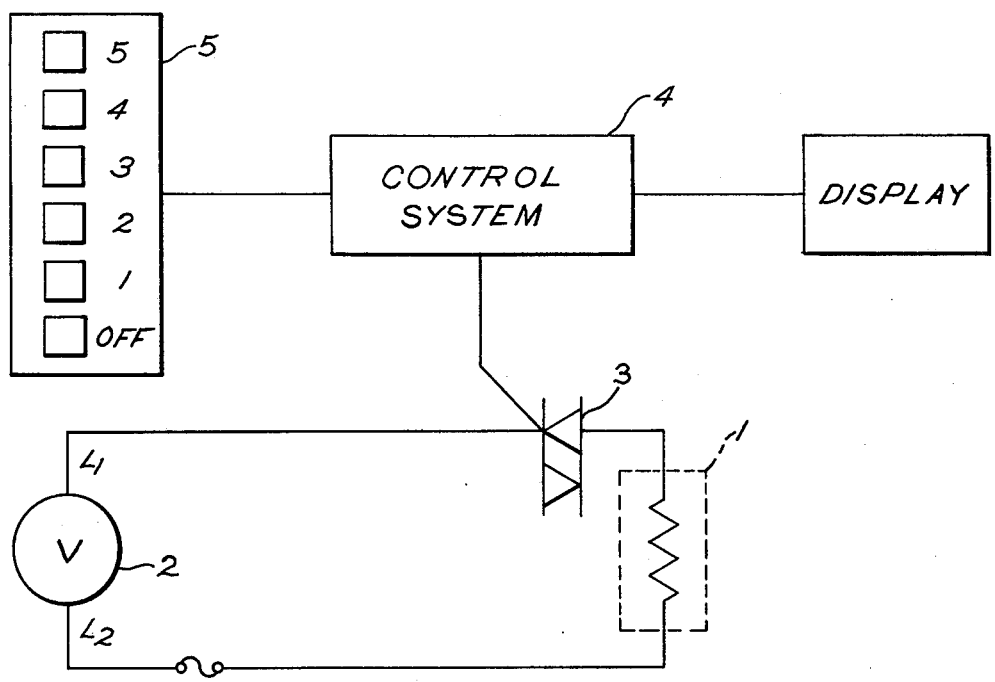
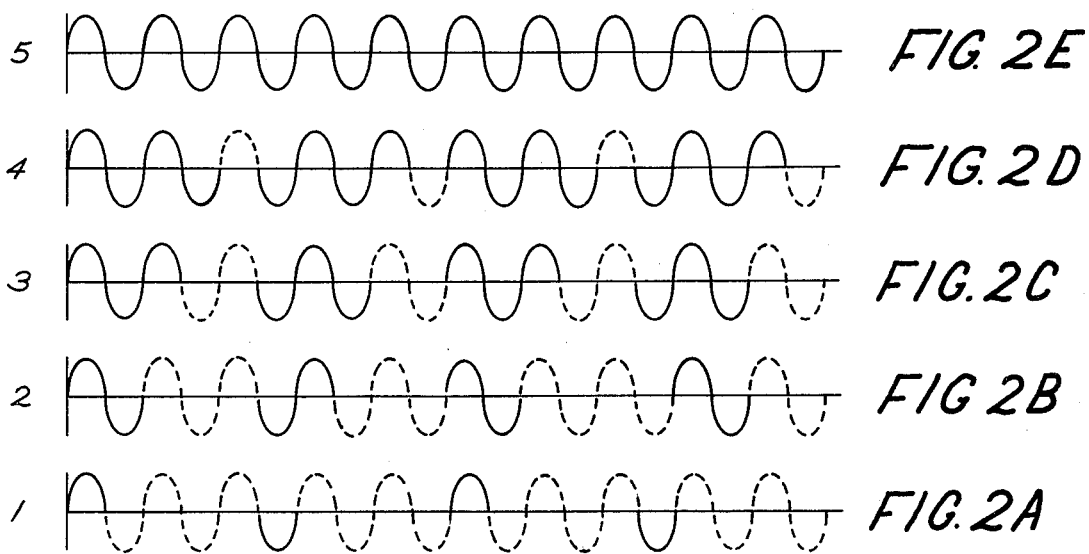

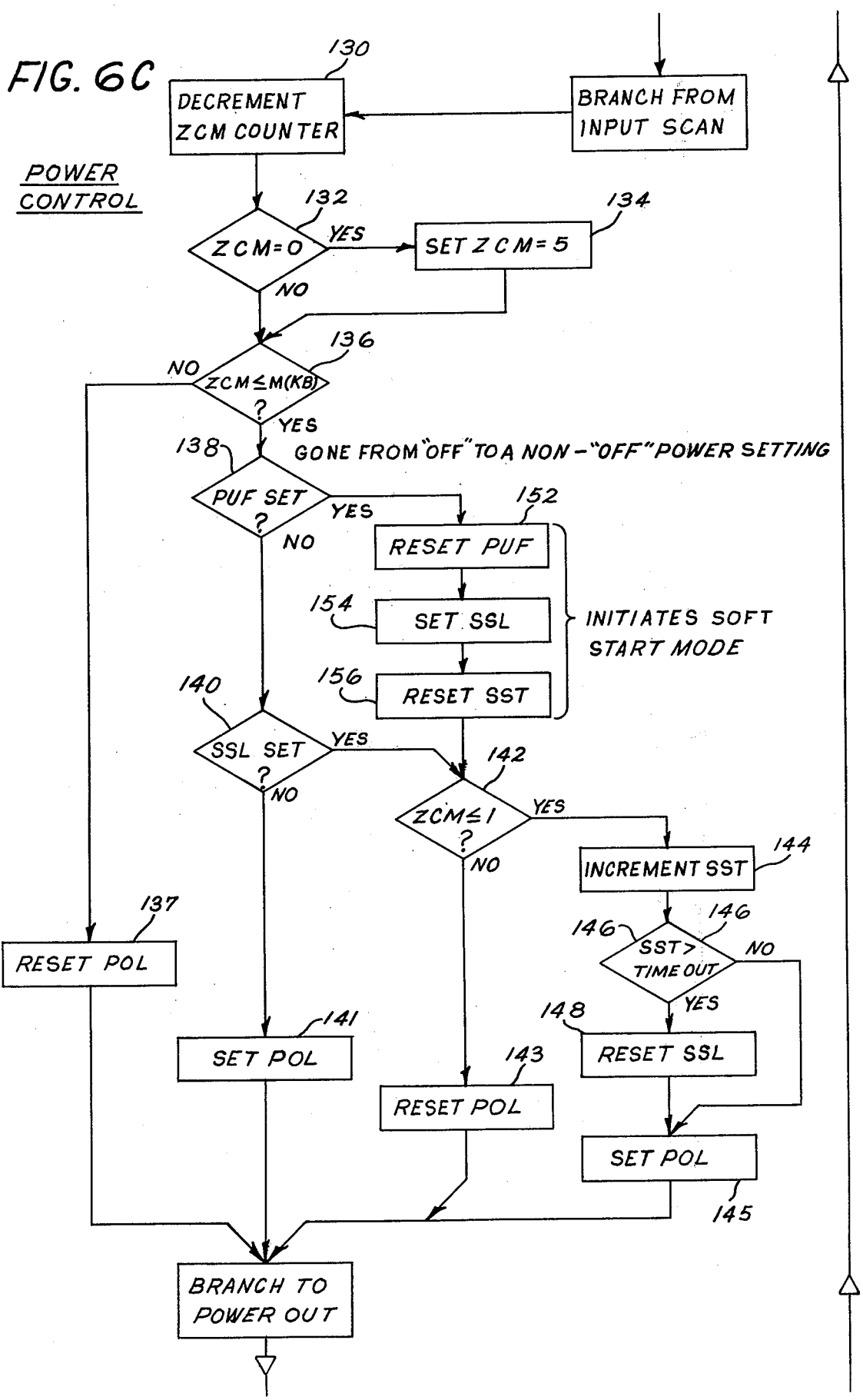

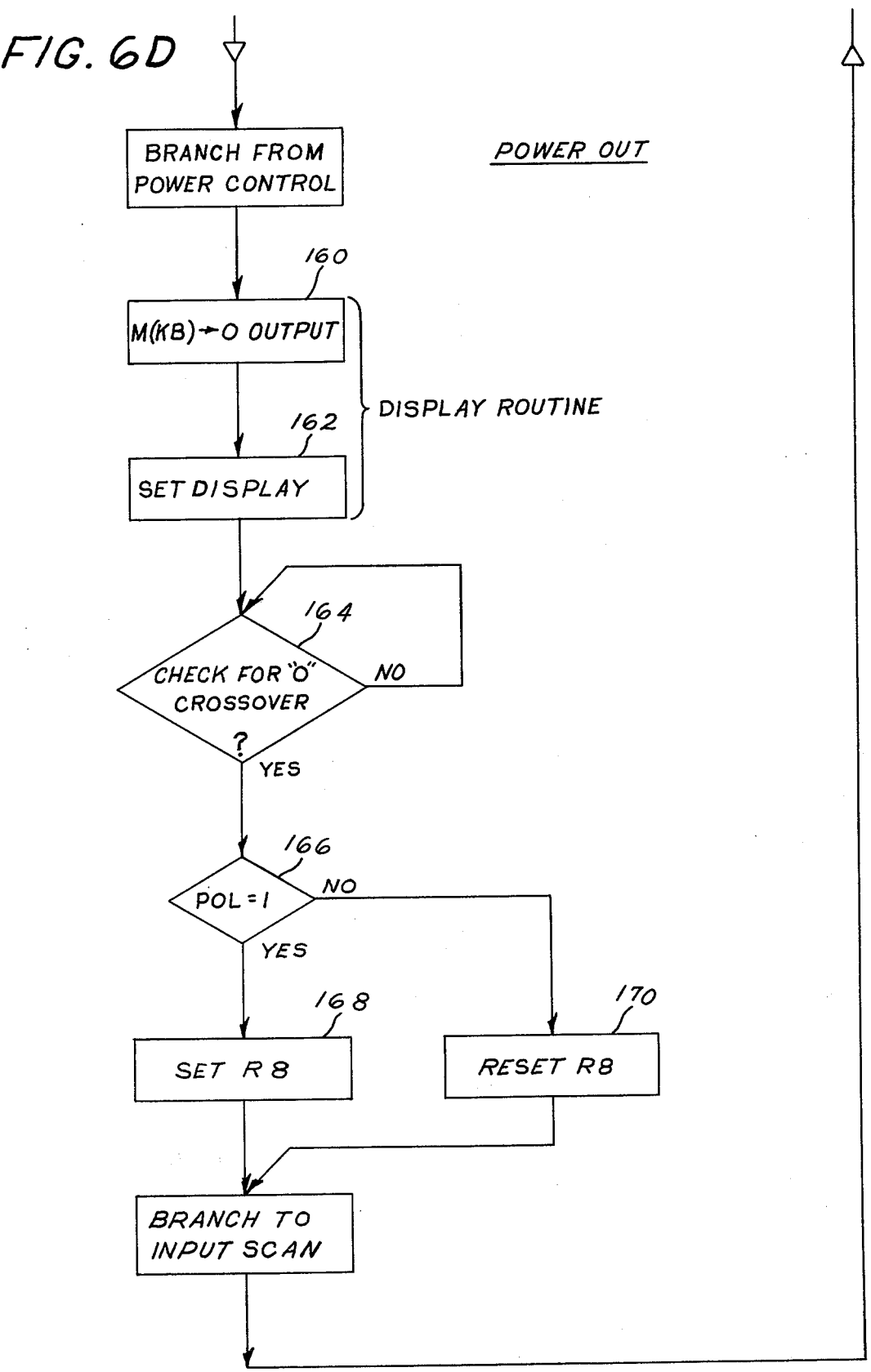

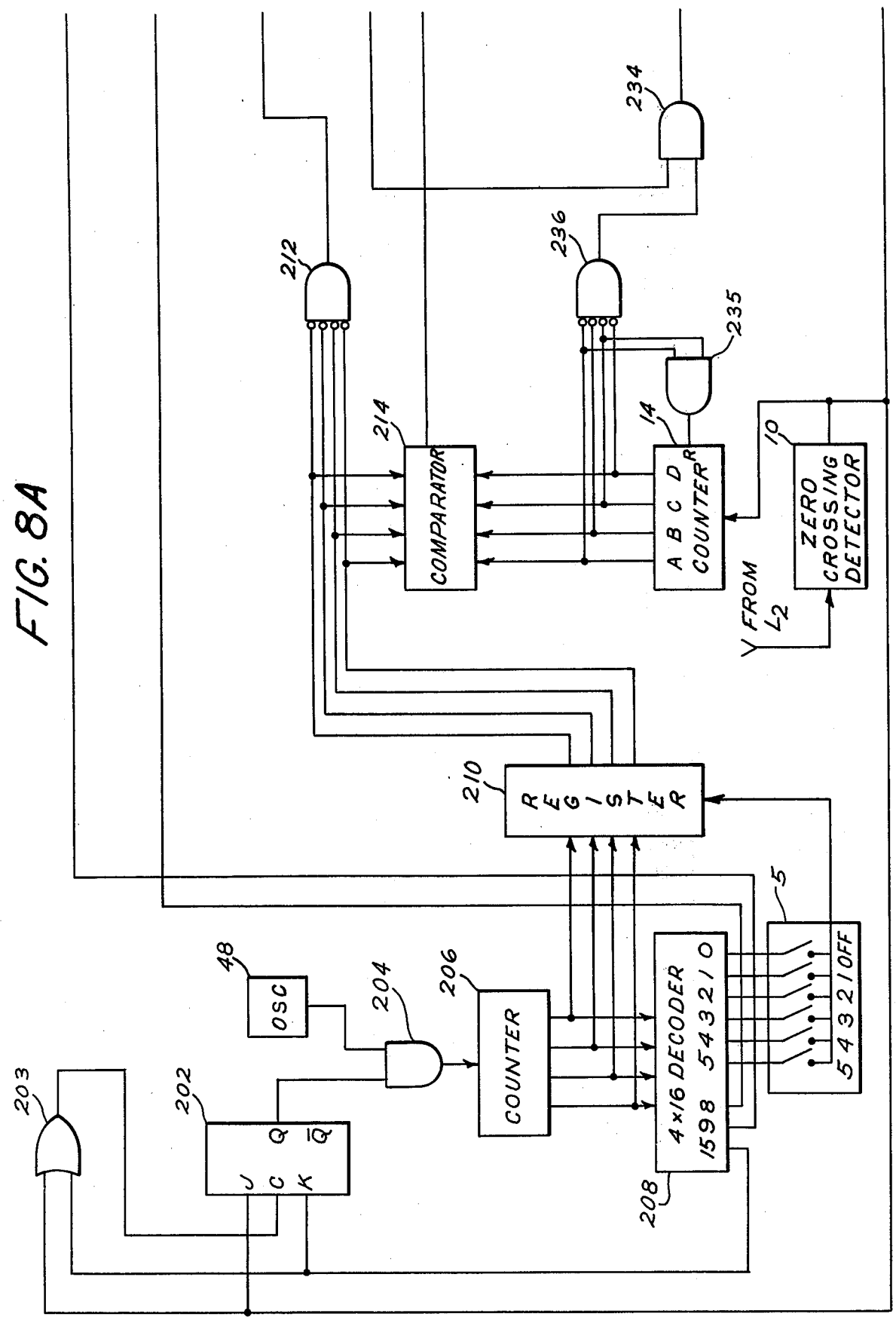

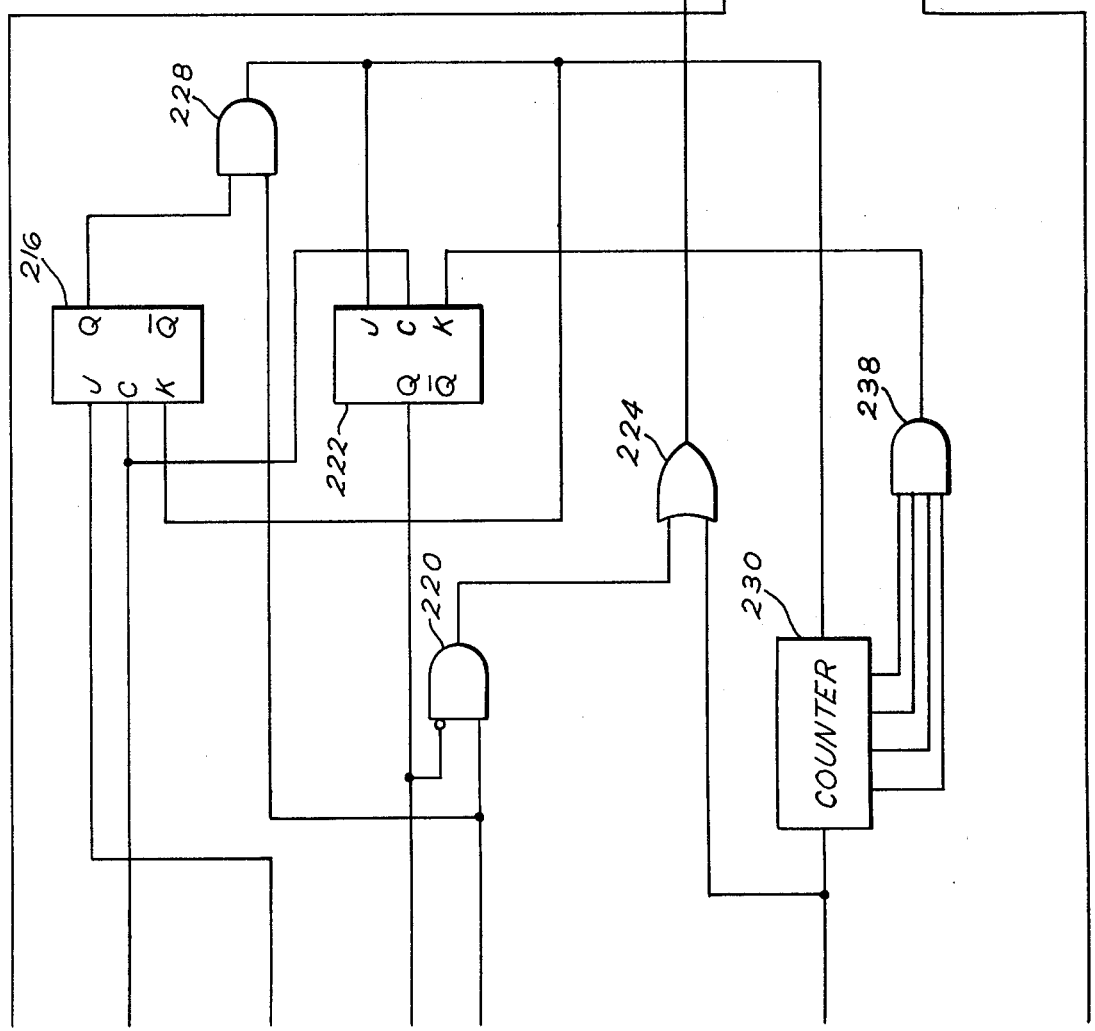

POWER CONTROL FOR APPLIANCE USING HIGH INRUSH CURRENT ELEMENT

CROSS REFERENCES TO RELATED APPLICATIONS

This application is related to the following commonly assigned, copending applications: Serial No. 8,356, "Improved Power Control for Appliance Using High Inrush Current Element," filed in the names of Thomas R. Payne and Alfred L. Baker; Serial No. 8,452, "Power Control for Appliance Using Multiple High Inrush Current Elements," filed in the names of Thomas R. Payne and Alfred L. Baker; and Serial No. 8,360, "Repetition Rate Power Control for Appliance Using High Current Inrush Elements," filed in the names of Thomas R. Payne and Alfred L. Baker.

The disclosures of the above-noted related applications are hereby incorporated by reference.

BACKGROUND OF THE INVENTION

Use of glass ceramic plates as cooktops in electric cooking apparatus is becoming increasingly common. Among the advantages of this smooth cooking surface is its pleasing appearance and easy cleanability. However, due to the high thermal impedance of the glass ceramic plate, such cooktops are less efficient thermally than conventional cooking surfaces using sheathed heating elements.

Due to unique electrical and thermal characteristics possessed by materials such as molybdenum disilicide ($MoSi_2$) and tungsten, heating elements made from these materials are attractive for use with glass ceramic cooktops. The high positive temperature coefficient of resistivity, low thermal mass, and low specific heat characteristic of $MoSi_2$ and tungsten and the high operating temperature achievable using heating elements made from these materials provide the potential for improved thermal efficiency for cooking apparatus which incorporate a glass ceramic cooktop. However, these same dynamic electrical and thermal characteristics create power control problems which have rendered the use of heating elements made from these materials impractical in electric cooking apparatus.

Conventionally, power control in electric cooking apparatus is achieved using temperature sensitive switches, such as bimetalic infinite heat switches. In operation, the operator adjusts the switch to provide the desired cooking temperature. The switch remains closed until the heating element reaches a predetermined temperature. The switch then opens and remains open until the element temperature drops to a predetermined temperature. The switch continues to cycle ON and OFF in this manner indefinitely. Since conventional sheathed heating elements heat up and cool down relatively slowly, these switching cycles are relatively long, ranging from a few seconds to thirty seconds. In addition, the resistance of a conventional sheathed heating element changes only slightly in going from room temperature to operating temperature. Since the resistance of conventional heating elements is relatively independent of temperature in the temperature range of interest, transient current surges when the switches close are minimal. Thus, conventional power control techniques work satisfactorily.

However, the dynamic characteristics of heating elements made from $MoSi_2$ or tungsten prevent these heating elements from being controlled using conventional control techniques. Firstly, a $MoSi_2$ heating element, as described in U.S. Pat. No. 3,912,905, typically varies in resistance from 2–3 ohms at room temperature to 25 ohms at an operating temperature of approximately 1000° C. Thus, assuming energization from a standard 240 volt AC household supply, as the temperature of the heating element changes from room temperature to operating temperature, the load current changes from an initial peak of roughly 110 amps to a steady state current on the order of 8.5 amps RMS. This initial current of 110 amps is obviously greater than can be tolerated in a household appliance except for extremely brief periods. Secondly, the heating element cools extremely rapidly; the first time constant for thermal response of this heating element being in the 600–1000 millisecond range. Since the elements cool rapidly with a concurrent drop in resistance, even a very brief termination of applied power followed by a subsequent application of power results in excessive current draw. A very rapid switching capability therefore is required to avoid frequent excessive current surges; brief ON times limit the duration of excessive current during the heat-up of the element; brief OFF times prevent unacceptable drops in resistance during steady state operation by limiting cooling of the element between ON times. Clearly, the relatively slow mechanical switching of the conventionally employed infinite heat switches cannot provide the rapid switching required to prevent excessive current flow during each application of power. Similarly, conventional electronic controls for use with conventional heating elements have been designed to employ relatively long ON and OFF periods.

A further problem created by the dynamic thermal characteristics of $MoSi_2$, tungsten, or similar heating elements is a visible light flicker phenomenon. These elements glow almost instantaneously with the application of power thereto. As the time between successive power pulses increases, the glow appears to flicker or oscillate between a higher and lower intensity. This flicker is annoying and is desirably eliminated.

OBJECTS OF THE INVENTION

Accordingly, it is a principal object of the present invention to provide a power control system for use with resistive heating elements which electronically controls power in a manner which prevents recurring excessive current surges during normal operation.

A further object of the invention is the provision of a power control system for use with resistance heating elements which draw relatively high current (above normal household maximums) upon the application of power at room temperatures.

A futher object is the provision of a power control system for controlling the application of power to heating elements of the above-noted type which prevents excessive recurring current surges during steady state operation by employing a relatively short control period time base, thereby reducing the duration of idle time between Power On periods at the lowest power setting to within acceptable limits.

A further object is the provision of a power control system which operates to limit high start-up current in such heating elements by repetitively applying short bursts of power during an initial transient heat-up period, the power bursts being of sufficiently short duration to limit the current drawn to within tolerable limits, but of sufficiently long duration to permit rapid heat up of the element.

A further object is the provision of a power control system for an electric range having heating elements of the above-noted type which responds to operator changes from an OFF power setting to any one of several heat settings by controlling power to the heating element over a first preselected time in accordance with a transient Soft Start control routine which is independent of the heat setting selected but which reverts to a steady state routine after completion of said transient routine until another setting is selected by the operator.

A further object is the provision of a power control system which limits the d.c. component of current in the power line.

It is a further object of the present invention to control power to the heating element in a manner which avoids annoying light flickering in the heating element.

SUMMARY OF THE INVENTION

These objects are accomplished in the present invention by providing an electronic power control system in which the output power of one or more heating elements in an electrically heated cooking surface, such as an electric range or hotplate, is electronically controlled to provide a heating level which corresponds to a power setting selected by an operator from a plurality of discrete power level settings.

The heating element is energized by an AC power signal. Electronic switching is employed to control the power applied to the heating element by controlling the number of conductive half-cycles during which power is applied to the heating element each control period.

The ratio of conductive half-cycles to total half-cycles in the control period, expressed as a percentage, is referred to as the duty cycle. A predetermined duty cycle is uniquely associated with each power setting. A digital control signal corresponding to the power setting selected by the operator is generated and stored in a memory. During steady state operation, the duty cycle is determined directly by comparing this control signal with a counter which counts power signal half-cycles. A very rapid switching cycle (or, conversely, short control period) is utilized to avoid frequent excessive current surges and to prevent annoying visible light flicker in the heating element. The control period comprises an odd number of power signal half-cycles so as to eliminate the d.c. component of the current in the power line. A triac in series with the heating element is triggered into conduction or not triggered into conduction based upon the results of this comparison, at the start of each power signal half-cycle.

In addition to this steady state operating mode, another operating mode designated a "Soft Start" mode, is provided by this invention. This Soft Start mode is initiated whenever the power setting is changed from an OFF or zero power setting to any other power setting. When operating in the Soft Start Mode the duty cycle is controlled independently of the actual power setting selected. An empirically predetermined duty cycle which enables optimum current to be applied to the heating element without exceeding the current-carrying capacity of the power circuit as the resistance of the heating element changes from its relatively low value at room temperature to its relatively high value at operating temperature is substituted for the duty cycle corresponding to the selected power setting. Both the duty cycle and the duration of this operating mode are selected so as to enable the heating element to rapidly attain its steady state resistance level without drawing excessive current. After a predetermined time has elapsed, the Soft Start Mode is terminated and the duty cycle corresponding to the selected power setting is implemented.

In the preferred embodiment of this invention, a microprocessor system provides the electronic control. However, the power control technique could also be implemented using discrete digital logic circuitry.

BRIEF DESCRIPTION OF THE DRAWINGS

FIG. 1 is a generalized block diagram of a cooking arrangement employing the invention;

FIGS. 2A–2E illustrate power signals corresponding to various operator selectable power level settings;

FIGS. 6A–6D are flow diagrams of the Power Up, Input Scan, Power Control and Power Out Routines, respectively, for the invention;

FIGS. 8A and 8B are logic diagrams for one digital logic embodiment of the invention;

FIG. 9 shows the interconnection between the logic diagrams of FIGS. 8A and 8B;

DETAILED DESCRIPTION

A. Overview

Figure 3:
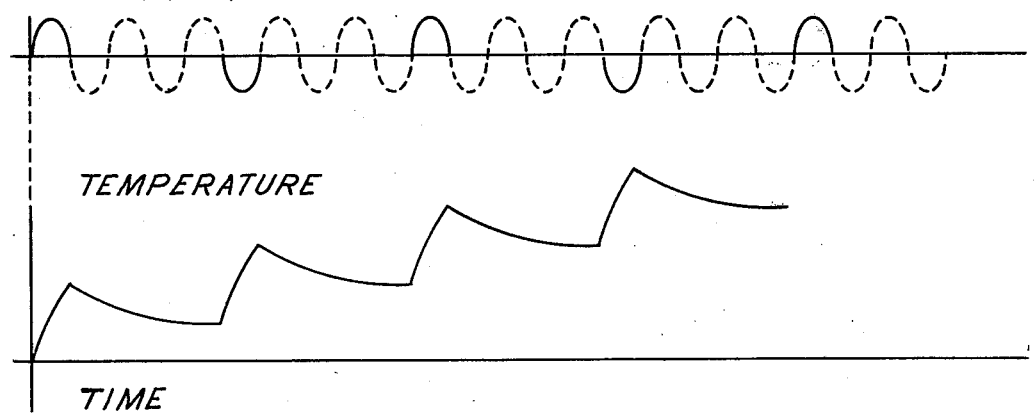
FIG. 3 is a graphical representation of the temperature response of the heating element during the Soft Start Mode of operation.

A generalized block diagram of the operation of the heating element control arrangement of this invention is shown in FIG. 1 wherein heating element 1 is energized by a standard 60 Hz AC power source 2 which can be either 120 volts or 240 volts. Power applied to heating element 1 is controlled by a conventional triac 3 connected in series with heating element 1. Triac 3 is switched into conduction by triac trigger signals generated by control system 4. Control system 4 generates these trigger signals in accordance with a power setting entered by an operator via keyboard 5. Keyboard 5 includes six control buttons including an OFF button and five power setting buttons enabling the operator to select one of five discrete power settings or OFF. Clearly, a greater or fewer number of power settings could be provided.

Control system 4 functions to select the percentage of time the triac 3 is conducting in response to various operator settings. More specifically, control system 4 controls the percentage of time during each control period that power is applied to the heating element. In the preferred embodiment a predetermined control period comprising a fixed number of control intervals is employed; the control system forces triac 3 into conduction for a particular number of these control intervals based on operator selected power settings. The ratio of conductive control intervals to total control intervals in the control period, expressed as a percentage, is referred to hereinafter as the duty cycle, a predetermined duty cycle being uniquely associated with each power setting.

As previously mentioned, the resistance of MoSi$_2$ type heating elements is on the order of 2–3 ohms at room temperature but increases to about 25 ohms at normal operating temperatures (1000° C.). Obviously, when the heating element is first energized at room temperature during the initial Power On period the peak current drawn will exceed the acceptable threshold limit of household overcurrent protective devices, as well as exceeding the acceptable current level for the triac switching device employed in the power circuit. However, peak current surges in excess of such maximum limits can be tolerated provided the duration is sufficiently short. It has been empirically determined that an ON period of 8.3 milliseconds corresponding to one half-cycle of a standard 60 Hz 240 volt AC power signal is sufficiently short to be tolerated by such protective devices without damage to electrical circuit components; whereas several such power halfcycles applied in succession to such heating elements at room temperature may cause current surges which exceed the acceptable threshold limit or may cause damage to electrical circuit components. Consequently, a minimum Power On period comprising, at most, a few power signal half-cycles is essential. In the preferred embodiment, this minimum period designated a control interval is one half-cycle of a 60 Hz AC power signal.

Because of the rapid cooling rate and the wide variation in the resistance of the MoSi$_2$ type heating element, selection of the duration of the control period is critical. The heating element can cool to less than 50% of its peak operating temperature in roughly one second. It will be further recalled that a change in element temperature from operating temperature to room temperature results in a decrease in resistance on the order of a factor of 10. In conventional power control systems for cooking apparatus, the idle time between Power On periods during steady state operation, particularly at the lower power settings, is on the order of ten seconds or longer, even for electronically controlled cooking apparatus. Clearly, such long idle times would allow the MoSi$_2$ type heating element to cool to near room temperature between Power On periods. The maximum idle time between Power On periods occurs at the lowest power setting, since at this setting the shortest Power On period is employed. According to the present invention, at the lowest power setting one power pulse is applied per control period. Thus, during steady state operation at this power setting the duration of the control period is of no consequence with respect to excessive current surges, since as previously described the duration of the power pulse has been chosen such that a single pulse applied to the heating element can be tolerated even if the heating element cools to room temperature between power pulses. However, the power control system must be capable of responding to changes in power setting from the lowest to the highest power setting without drawing excessive current. Therefore, a control period such as is conventionally employed, which is large enough to allow the heating element to cool to near room temperature between power pulses, is unacceptable. If such a control period were employed, a change in power setting from the lowest to the highest setting would subject the heating element which has cooled to near room temperature since the preceding power pulse to a succession of power pulses rather than a single power pulse, thereby greatly exceeding the tolerable current threshold with resulting triggering of circuit breakers and damage to other circuit components. Consequently, the control period must be short enough to prevent the heating element when operating at its lowest power setting, from cooling to near room temperature between power pulses. Accordingly, the control period should not exceed roughly one second. In the embodiment of the power control system of the present invention the control period is on the order of 100 milliseconds.

In addition to the problems outlined above, the dynamic characteristics of MoSi$_2$ and tungsten type heating elements also contribute to an observable light flicker problem. The heating element itself, when energized, radiates visible light giving the element a bright glowing appearance. The radiant energy fluctuates in concert with the power pulses applied to the heating element.

The problem results from the fact that for duty cycles in which the frequency of Power On periods or conductive half-cycles is slow relative to the response time of the human eye, the visible glow radiating from the heating element flickers noticeably. However, for duty cycles in which the frequency of the conductive half-cycles is fast relative to the response time of the human eye, the glow radiating from the heating element appears as a steady glow because of the integrating effect of the human eye, even though it may in fact be flickering. Thus, selection of a control period in which the frequency of the conductive half-cycles is fast with respect to the human eye at all duty cycles provides one solution to the problem. However, to achieve the desired range of output power settings, it may be necessary to provide a longer control period, and provide duty cycles for which the frequency of conductive half-cycles is slow relative to the response of the human eye. In this instance the problem is solved by proper selection of the glass ceramic cooking surface material. The glass ceramic material tends to attenuate the visible glow radiating from the heating element, the degree of attenuation at any particular level of radiant energy being a function of the emissivity of the glass ceramic material. Since there is considerable variation in emissivity among available glass ceramic materials, it is possible to select a material having an emissivity such that the visible radiant energy at those energy levels corresponding to those lower duty cycles for which a flicker is observable when the heating element is viewed directly are attenuated by the glass ceramic material to the extent that no visible glow is observable through the material. By employing such a material, the radiant glow is observable as a steady glow for the higher duty cycles varying in intensity for each of those duty cycles; and no visible glow is perceived for the lower duty cycles.

In one embodiment of the present invention a control period of five power half-cycles is employed. This control period is of sufficiently short duration (approximately 40 milliseconds) to satisfactorily avoid both the excessive current problem and the light flicker problem alluded to above. In this embodiment, duty cycles of 20%, 40%, 60%, 80% and 100% corresponding to power settings one through five, respectively, are achieved by providing one, two, three, four, and five conductive half-cycles per control period respectively.

Table I shows the relationship between power setting, duty cycle, and heating element output power for this embodiment.

TABLE I

| Control Signal Code | Power Setting | ON/OFF (Duty Cycle) | % Full Power Delivered to Heater |
|---|---|---|---|
| 0101 | 5 | 5/5 (100%) | 100% |
| 0100 | 4 | 4/5 (80%) | 85% |
| 0011 | 3 | 3/5 (60%) | 78% |
| 0010 | 2 | 2/5 (40%) | 62% |
| 0001 | 1 | 1/5 (20%) | 45% |
| 0000 | OFF | — (0%) | 0% |

FIG. 2 illustrates the voltage waveform of the power signal applied to the heating element for each of the five power level settings. Each half-cycle shown in dark lines constitutes a conductive cycle, during which triac 3 is triggered into conduction. The cycles shown in phantom represent cycles during which triac 3 is non-conductive and no power is applied to the heating element. As shown in Table I and FIG. 2, for a power setting of 3, the duty cycle is 60%, i.e. 3 conductive cycles per control period. To implement this duty cycle, control system 4 triggers triac 3 into conduction for three consecutive power signal half-cycles, then switches it non-conductive for two power signal half-cycles.

As alluded to hereinbefore, because of the dynamic thermal and electrical characteristics of $MoSi_2$ type heating elements, application of power at any other than a low duty cycle is applied initially to the element at room temperature results in a current surge in excess of acceptable household limits. To avoid such an occurrence, a transient mode designated Soft Start is provided whenever the power is applied to a heating element at a relatively cool temperature.

In this transient mode a predetermined duty cycle is implemented independently of the actual power setting selected for a predetermined time period sufficient to raise the resistance of the heating element to a level which will limit the RMS current drawn by the element to within acceptable limits during Steady State operation. At the expiration of this time period, the duty cycle required by the actual operator-selected power setting is implemented.

In addition to limiting the current drawn during the transient start-up period, it is also desirable to increase the temperature and consequently the resistance of the heating element as rapidly as possible. Accordingly, a duty cycle which provides an optimum compromise between these competing considerations is desirable. A satisfactory duty cycle for this mode then is one in which the conductive half-cycles are sufficiently closely spaced in time to prevent the heating element from cooling down excessively between conductive cycles but sufficiently spread in time to keep the current within acceptable limits.

It has been empirically determined that a duty cycle of 20% satisfies the above requirements. For a five half-cycle control period this is simply one conductive cycle per control period. A typical heating element temperature versus time curve for the 20% duty cycle is shown in FIG. 3. As shown in FIG. 3, the heating element is prevented from cooling down fully between conductive cycles. Applying this Soft Start duty cycle for a period of approximately ½ second allows the heating element to reach a temperature at which the resistance is high enough that the heating element will not draw excessive current. Rather than providing a positive indication of the temperature of the heating element, the system goes through a Soft Start sequence whenever a particular power setting is actuated subsequent to the use of the OFF setting. Because of the rapid cool down characteristics of the heating elements used in the system, this provides a sufficiently accurate temperature monitor.

B. Functional Operation of System

Figure 4:
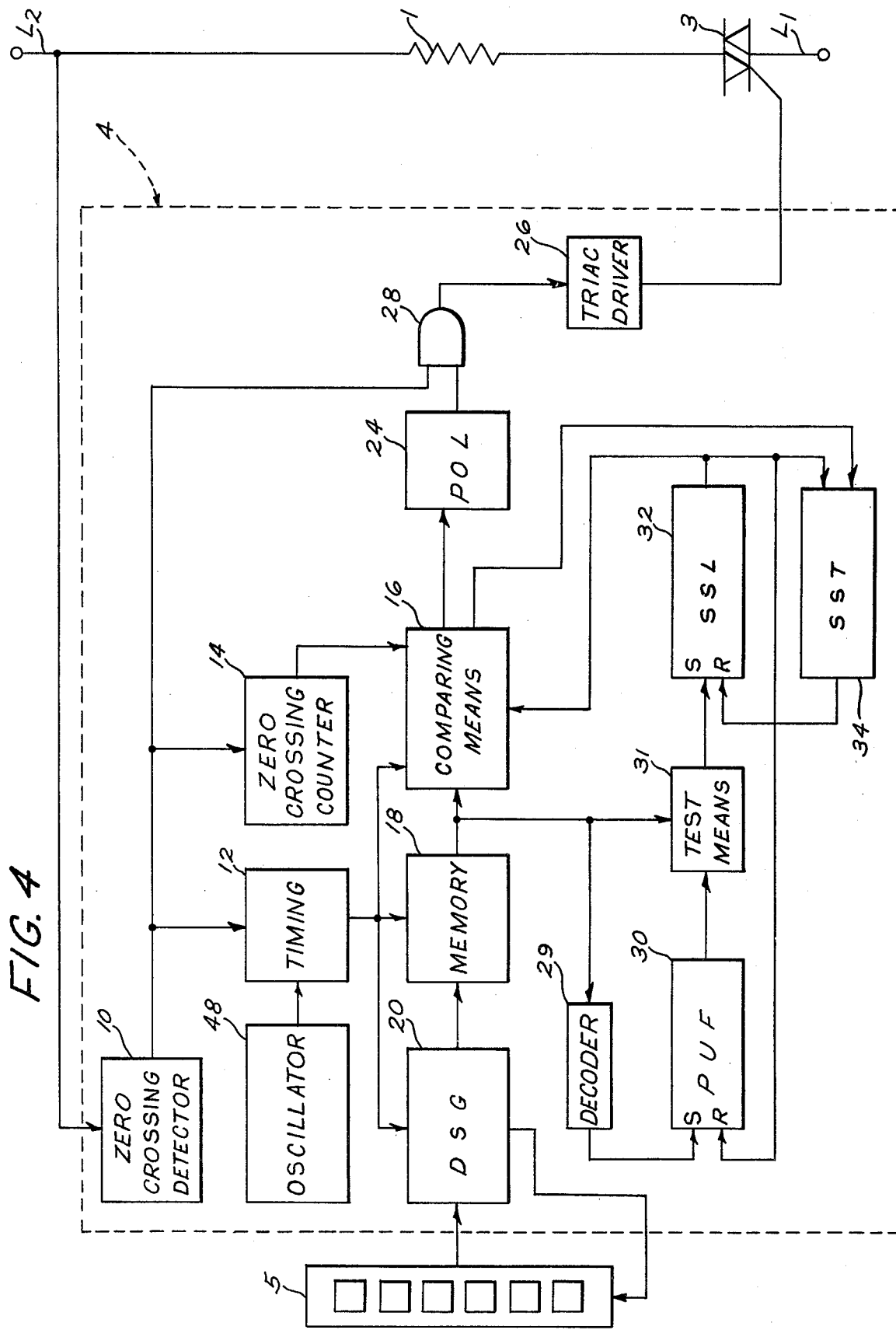
FIG. 4 is a functional block diagram of the control system of the invention.

FIG. 4 is a functional block diagram of control system 4 of FIG. 1. Control system 4 makes a decision to trigger or not to trigger triac 3 into conduction every power signal half-cycle. Control system operation is synchronized with the zero crossings of the power signal such that the triggering decision is made during each half-cycle for the next half-cycle. The switching is accomplished at the zero crossing of the power signal to enhance triac reliability and to minimize electromagnetic interference resulting from switching transients.

Zero crossing detector 10 monitors the AC power line L2 and generates a zero crossing pulse upon detecting a zero crossing of the AC power signal. For a standard 60 Hz AC power signal the zero crossing pulse rate is 120 Hz. The period between leading edges of these zero crossing pulses defines a control interval.

It will be recalled that the control system operates in what can be visualized as two modes, a steady state mode and a transient or soft start mode. In the steady state mode the control system operates to control the duty cycle of the triac based solely on the operator power setting. Once having entered this mode, it operates therein until the system is turned OFF by actuation of the OFF key.

In the transient or Soft Start mode, however, the control system 4 operates to control the duty cycle independently of the power level setting for a preselected time after which it makes a transition to the Steady State Mode. Implementation of the Soft Start Mode is initiated by the detection of a transition from an OFF condition to any one of the power level conditions.

During steady state operation the control system of FIG. 4 implements the desired duty cycle by comparing the contents of zero crossing Master Counter 14, designated ZCM, with the digital control signal stored in memory 18, designated M(KB), once each clock cycle. Zero crossing Master Counter 14 repetitively counts a predetermined number of zero crossing pulses equal to the number of half-cycles, or control intervals, in the control period and resets. Digital control signal M(KB) is the binary representation of the number of conductive cycles associated with the duty cycle for the selected power setting. Thus, the maximum count of Counter 14 can be visualized as representing the total control period, with the conductive portion of the control period being represented by M(KB).

For the embodiment employing a five half-cycle time base, or control period, Counter 14 is arranged to repetitively count as a ring counter from one to five. The digital control signal code stored in memory 18 for each power setting is shown in TABLE I.

For example, assume power setting 3 has been selected. As shown in TABLE I and FIG. 2, the duty cycle is 60% requiring three consecutive conductive cycles per control period. M(KB) is 0011. For three consecutive counts ZCM is less than or equal to M(KB) causing Power On Latch 24 (POL) to be set. For two consecutive counts, ZCM is greater than M(KB), causing latch 24 to be reset. Thus, latch 24 is set during three consecutive power half-cycles and reset during two such half-cycles every control period, resulting in triac 3 being conductive for three consecutive half-cycles every five half-cycle period, thereby providing the required 60% duty cycle.

It will be recalled that the Soft Start operating mode is initiated when the power setting is changed from OFF to any other power setting. In this mode a Soft Start duty cycle is temporarily substituted for the Steady State duty cycle independently of the actual power setting. Decoder 29, Power Up Flag (PUF) 30, test means 31, Soft Start Latch (SSL) 32 and Soft Start Timer (SST) 34 are used to implement the Soft Start Mode of operation. Decoder 29 monitors the contents of memory 18, M(KB), looking for the entry of a signal representing an OFF power setting. When an OFF power setting is detected, decoder 29 sets PUF 30. Test means 31 monitors PUF 30 and memory 18. The condition in which M(KB) represents a non-OFF power setting and PUF 30 is set indicates that the power setting has been switched from an OFF setting to some other setting. When test means 31 detects this condition, it initiates the Soft Start Mode by setting SSL 32. The setting of SSL 32 causes Soft Start Timer (SST) 34 to begin timing the Soft Start period, resets PUF 30 and provides an input to comparing means 16 which causes comparing means 16 to override the Steady State duty cycle and implement the Soft Start duty cycle. A Soft Start duty cycle of 20% is implemented simply by setting Power On Latch (POL) 24 only when ZCM equals the count of binary one, which of course occurs once every five counts. Upon the expiration of a predetermined time, SST 34 resets SSL 32, terminating the Soft Start period. Comparing means 16 then implements the Steady State duty cycle.

Triac driver 26 serves to amplify the triac trigger signal and isolate the control circuit from the power circuit. The output of triac driver 26 is applied to the gate input of triac 3.

Oscillator 48 and timing circuit 12 provide internal timing signals to synchronize the internal processing of control signals. Digital signal generator (DSG) 20 periodically scans keyboard 5 and generates a digital signal corresponding to a newly-entered power setting for storage in memory 18.

C. Microprocessor Implementation

Figure 5:
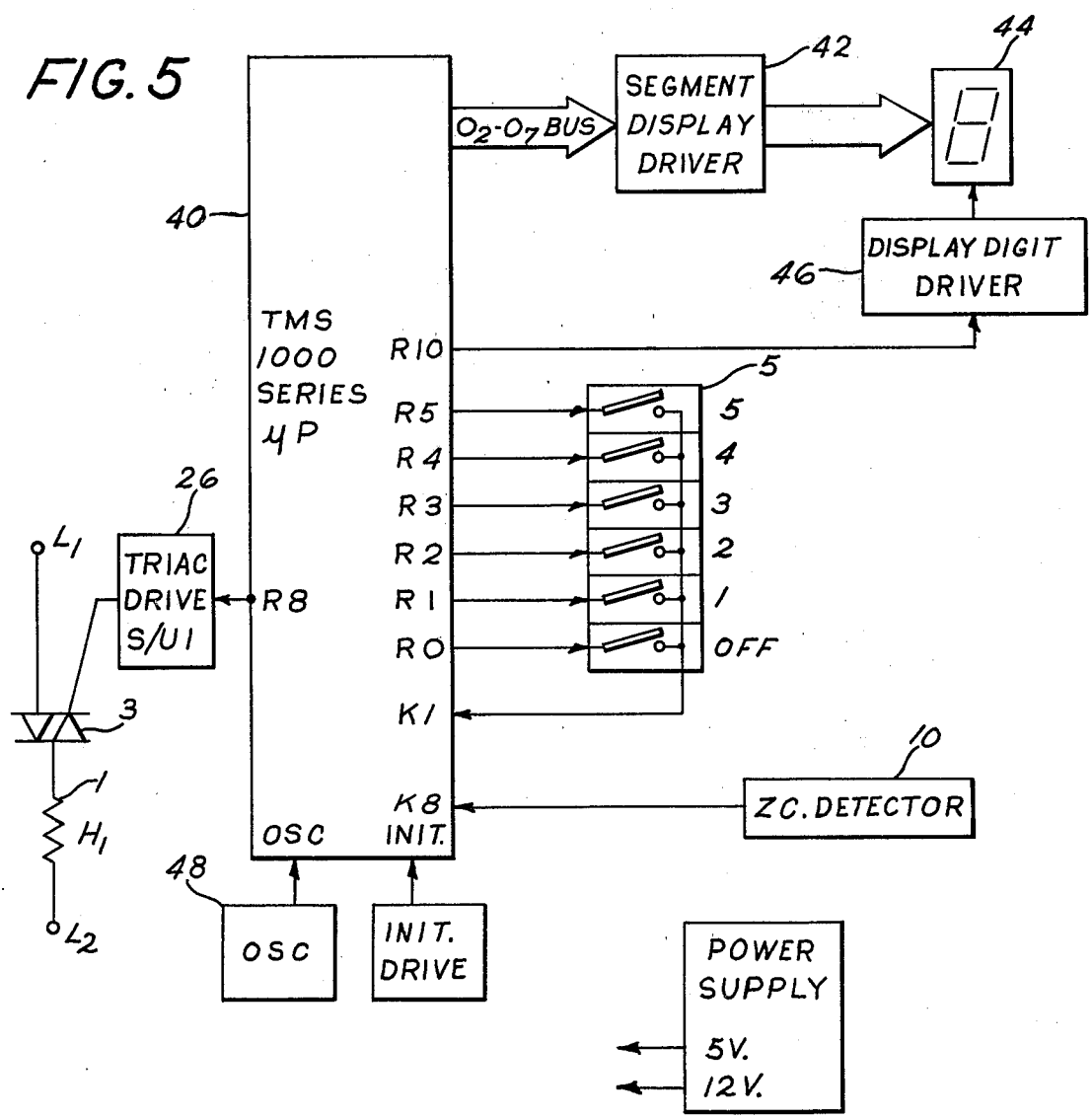
FIG. 5 is a block diagram of the microprocessor based embodiment of the invention.

FIG. 5 schematically illustrates a preferred embodiment of a control circuit for a single heating element glass ceramic hotplate employing a $MoSi_2$ heating element 1, in which power control is provided electronically by a TMS 1000 series microprocessor or chip. Technical details concerning the general characteristics of the chip are available in a Texas Instruments, Inc. publication entitled "TMS 1000 Series Data Manual," published December 1975.

Referring to FIG. 5, chip 40 is a TMS 1000 series microprocessor chip which has been customized by permanently configuring the read only memory (ROM) to implement the control scheme of the present invention. Keyboard 5 is a mechanical keyboard, which includes 6 keys enabling the operator to select from an OFF setting and five power settings. Keyboard 5 is electrically connected to chip 40 via 6 keyboard input lines and one keyboard output line. Each key includes a normally open mechanical switch connecting a corresponding keyboard input line to the keyboard output line. When a key is depressed, the switch closes, connecting the associated keyboard input line with the common keyboard output line, thereby coupling any signal present on that input line directly to the output line.

Scanning of keyboard 5 to detect an operator input is accomplished by causing a scanning signal in the form of a voltage pulse to appear sequentially at output lines R0–R5 of chip 40. If a key is depressed the pulse present on the keyboard input line associated with the depressed key will be coupled directly to chip input line K1 via the keyboard common output line, indicating to the chip that an operator input is present at the key currently being scanned.

Chip output line line R8 is electrically connected to the input of triac driver network 26. Output lines Oo–O7 are electrically connected to the input lines of segment display driver 42. The output of driver 42 is electrically connected to the segmented LED digital display 44. Output line R10 is electrically connected to the input of display digit driver network 46.

Chip output lines Oo–O7 provide display information to segment display driver 42 which amplifies these signals in a conventional manner to energize the appropriate segments of a conventional seven-segment LED digital display to enable the display of a symbol representative of the power level selected. The display information is processed and displayed in a conventional manner well known to those skilled in the art of microprocessor applications.

The output of zero crossing detector 10 is electrically coupled to chip input line K8, to enable the chip to synchronize triac switching with zero crossings of the power signal. Oscillator 48 comprises a circuit for generating timing pulses for synchronizing the internal information processing by chip 40. The output of this circuit is electrically connected to input line OSC of chip 40.

C. 1 Control Routines

The control program which is permanently configured in the ROM of chip 40 to enable chip 40 to perform the control functions of this invention will be described with reference to the flow diagram of FIGS. 6A–6D. Except for the Power Up Routine which is cycled through only when the system is initially powered up, microprocessor 40 cycles through each routine sequentially during each control interval.

C. 1(a) Power Up Routine

Figure 6A:
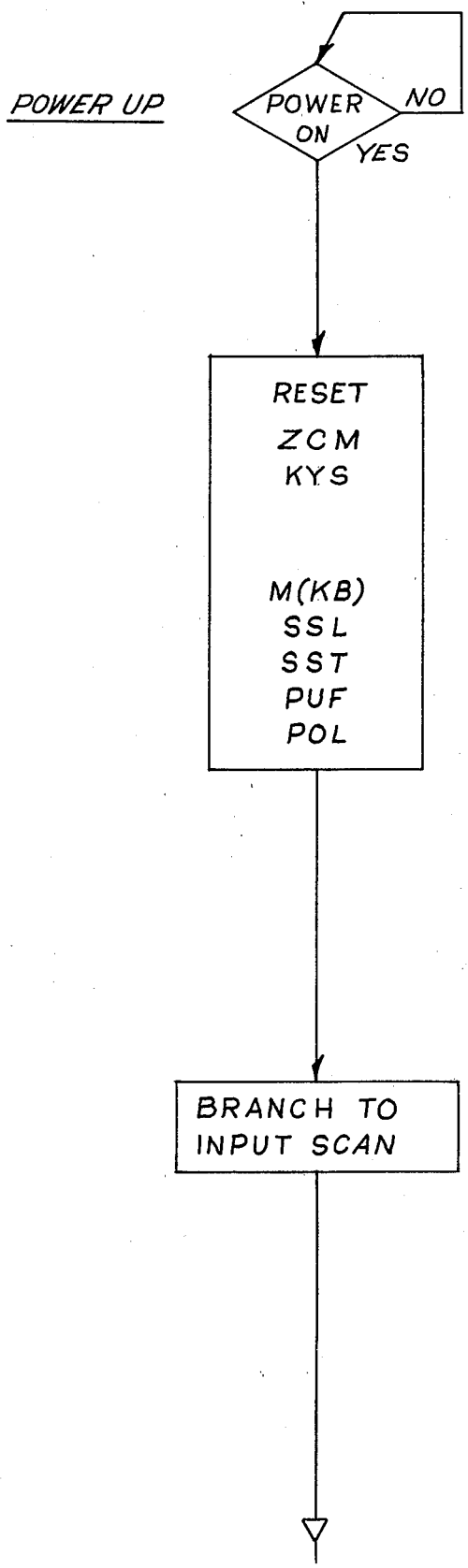
Figure 7:
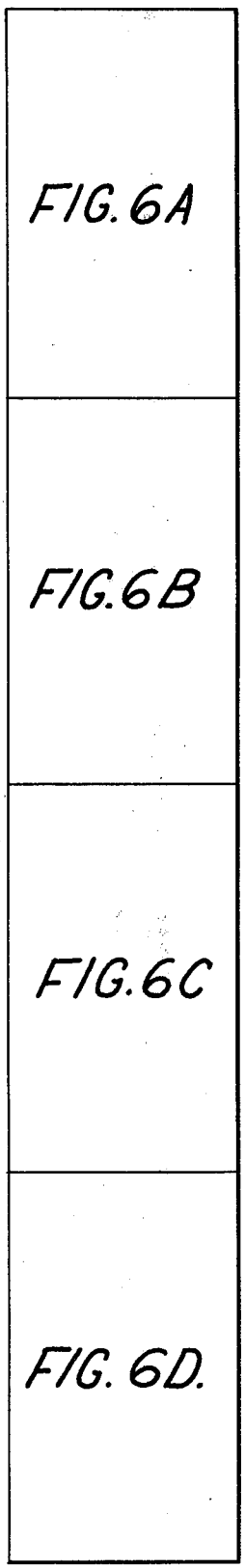
FIG. 7 shows the interrelationship between the various Routines of FIGS. 6A–6D.

FIG. 6A illustrates the Power Up Routine which initializes the various counters and latches internal to chip 40 when power is initially applied to the system such as when the unit is connected to the power line by plugging the system input power line into a wall receptacle, or following an interruption in power service. This routine is not entered when the heating element power setting is merely switched from OFF to some other power setting.

C.1(b) Input Scan Routine

Figure 6B:
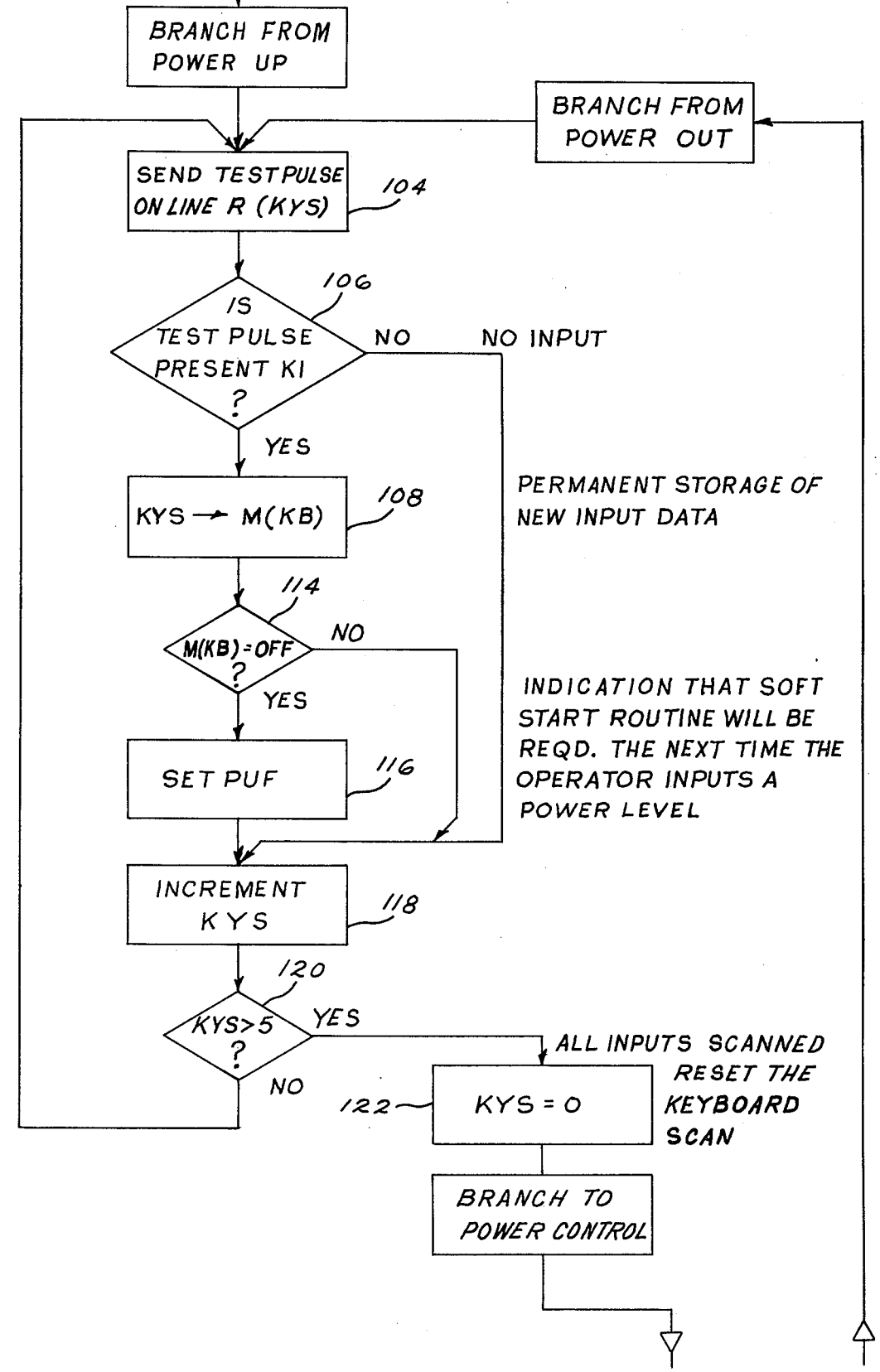

FIG. 6B illustrates the Input Scan Routine. In this routine, the keyboard keys are sequentially scanned to determine whether it is necessary to update the power setting M(KB) stored in memory due to a keyboard key being activated. All six keys are sequentially scanned in this routine. This routine is cycled through each control interval to completely scan keyboard 5 for new inputs every control interval.

It will be recalled from FIG. 5 that chip 40 has 6 output lines R0–R5 electrically connected to keyboard 5, each line being associated with one key.

The keys are scanned in the following manner:

The Ro-R5 output ports are sequentially addressed by a counter KYS which serves to place a test pulse on the addressed output line R(KYS) (Block 104). Concurrently, input port K1 is monitored to detect the return of the test pulse which would signify depression of the addressed key (Block 106).

If the test pulse is present on the K1 line, the count of the counter KYS is stored in a control register as a digital control word M(KB) to be used in controlling the duty cycle of the triac (Block 108). If no test pulse is present, the program branches to Block 118 to increment the KYS counter, the counter KYS is then tested to determine whether all keys have been scanned (KYS>5, Block 120). If other lines remain to be scanned (KYS≦5) the program returns to Block 104; if all keys have been scanned, the KYS counter is reset to binary 0 (Block 122) and the program branches to the Power Control Routine, FIG. 6C.

In this fashion, as the counter KYS is incremented, each successive operator input power control key is interrogated and digital control signal corresponding to the selected setting is stored as M(KB) in memory, if the tested key is depressed.

Since, as discussed generally above, power to the heating element must be controlled in a special manner when a cool heating element condition exists (as indicated by a previously depressed OFF key), the input routine provides a sequence for identifying this condition. The flow chart illustrates this in Blocks 114 and 116 where the stored digital control signal M(KB) is tested. If M(KB) equals binary 0, indicating that the new input represents an OFF setting, the PUF latch is set. The state of the PUF latch is used in the Power Control Routine (FIG. 8) to determine whether or not this special or Soft Start Mode will be initiated.

C.1(c) Power Control Routine

FIG. 6C illustrates the Power Control Routine. In this routine the decision to set or reset the Power On Latch (POL) is made during a control interval (i.e. between successive zero crossover pulses) by comparing the digital control signal M(KB) with the contents of a zero crossing master counter ZCM.

It will be recalled that the particular duty cycle corresponding to a power setting is implemented by a less than or equal to comparison between ZCM and M(KB). This is accomplished in this routine in the following manner.

As illustrated in Blocks 130, 132 and 134, ZCM acts as a counter which counts down from 5 to 1 and is reset to 5, the count being decremented once each control interval.

As illustrated in box 136 when the comparison ZCM≦M(KB) is not satisfied, latch POL is reset (Block 137) which inhibits triac triggering. When the above comparison condition is satisfied, triac triggering is called for in the Steady State Mode. However, before POL is set, further decisions are needed to determine what operating mode to be employed, whether Steady State or Soft Start.

It will be recalled that when set, the PUF flag provides an indication that the power setting immediately preceding the newly-received power setting was an OFF power setting. In this routine PUF is tested (Block 138). Note that this routine is only entered when there is a non-OFF power setting in M(KB). When Block 138 determines that PUF is set, the Soft Start Mode is initiated by setting the Soft Start Latch (SSL) (Block 154) and resetting the Soft Start Timer (SST) (Block 156). The PUF latch is also reset (Block 152).

When the PUF latch is not set, it is not necessary to initiate a Soft Start Mode, but it remains to be determined if a previously initiated Soft Start Mode is still in progress, as indicated by a set Soft Start Latch. If the Soft Start Latch is not set (Block 140) indicating operation in the Steady State Mode, the POL latch is set (Block 141). When SSL is set, the duty cycle is controlled in accordance with a comparison between ZCM and a constant equal to one particular count of ZCM. In this embodiment, the count has been chosen to be a binary one (Block 142). Clearly, ZCM will be less than or equal to one, once every five counts. Setting POL when this inequality is satisfied (Block 145) and resetting it otherwise (Block 143) provides the 20% Soft Start duty cycle. In addition when the equality is satisfied, the Soft Start Timer is incremented, as illustrated by Block 144. The Soft Start Timer controls the duration of the Soft Start Mode by resetting the Soft Start Latch, thereby terminating the Soft Start Mode upon reaching a predetermined count (Blocks 146 and 148). This embodiment uses a predetermined count of 16 for the SST in order to provide a 532 millisecond duration for the Soft Start Mode.

C.1(d) Power Out Routine

FIG. 6D is the Power Out Routine. In this routine M(KB) data is sent to the 0 output lines of chip 40, and the display is set (Blocks 160 and 162). In Block 164 the program delays until the next zero crossing pulse is received. Upon receipt of the zero crossing pulse, if POL is set, i.e. equal to one (Block 166), a set signal is generated at chip output line R8 (Block 168), if POL is reset, a reset signal is generated at R8 (Block 170). The program then returns to the Input Scan to repeat the cycle. This synchronizes the control signals generated by chip 40 with the zero crossings of the line power signal applied to heating element 1.

D. Discrete Logic Control Circuit

Thus far the discussion of the flow diagrams has been directed to a preferred embodiment in which the control circuit uses a microprocessor in which the program previously described is permanently stored in the ROM of the microprocessor. However, the scope of the present invention is not limited to this embodiment. One skilled in the art of logic circuit design could implement the control scheme of this invention as illustrated by the flow diagrams of FIGS. 6A–6D using hard wired digital logic integrated circuits. FIGS. 8A and 8B illustrate an alternate embodiment in which the control scheme illustrated in the block diagram of FIG. 4 and the flow diagrams of FIGS. 6A–6D are implemented using hard wired digital logic integrated circuits.

D.1 Timing and Keyboard Scan

The keyboard scanning function is implemented in the alternate embodiment in the following manner, as shown in FIG. 8A. Zero crossing detector 10 generates a pulse which sets timing flip-flop 202, a conventional J-K flip-flop. Therefore, the logic circuitry of this embodiment is cycled through once each control interval. The control interval is, again, the period between leading edges of successive zero crossing pulses. The Q output of flip-flop 202 is ANDed with the output of oscillator 48 via AND gate 204. AND gate 204 couples the output of oscillator 48 to the input of counter 206. Oscillator 48 is a conventional oscillator capable of generating clock pulses at frequencies in the range of 10 KHz–300 KHz. Counter 206 is a conventional 4-bit binary ripple through counter such as the readily available integrated circuit SN7493. The 4 output lines of counter 206 are coupled to the input of decoder 208. Decoder 208 is a standard 4-line to 16-line decoder such as integrated circuit SN74154. Decoder output lines 0–5 are electrically connected to keyboard 5. As previously described, keyboard 5 has an input line for each key actuated switch. Decoder output line 0 is connected to the OFF input line, and decoder output lines 1–5 are connected to keyboard input lines 1–5, respectively. Three of the ten remaining decoder output lines are used for timing signals which will be described later. Keyboard 5 has a switch output line which is common to all the key switches. This line is connected to the enable input of shift register 210.

Shift register 210 is a conventional 4-bit parallel-in-parallel-out storage register such as that available as an integrated circuit identified by serial number SN7495. Storage register 210 performs the memory function for the circuit. The contents of storage register 210 represent the power level selection last entered via keyboard 5. Keyboard 5 communicates with storage register 210 as follows. When flip-flop 202 is set by zero crossing detector 10, internal clock pulses from oscillator 48 are gated to counter 206 via gate 204. As counter 206 counts from 0–5, scanning pulses appear sequentially at the output of decoder 208 on lines 0–5, respectively. The output of counter 206 is also present at the input lines of shift register 210. When a key is actuated, the corresponding switch is closed. Thus a pulse at the corresponding output line of decoder 208 is coupled through the closed switch in keyboard 5 to the input enable line of register 210, causing the signals present at the input lines of register 210 to be stored therein. These storage register input lines are coupled directly from the output lines of counter 206, thus the storage register stores the count corresponding to the actuated key.

As an example of the scanning circuit operation, assume the operator selects power setting 3 by actuating key 3. As counter 206 counts the fourth timing pulse from gate 204, 0011 will appear at its output and at the input of register 210. The switch of key 3 is closed causing the pulse on output line 3 of decoder 208 to be transferred to the enable input of shift register 210, causing register 210 to store the signal 0011. The contents of register 210 will remain unchanged until a keyboard key is again actuated and a subsequent input enable signal is communicated to register 210.

The keyboard scan is complete when counter 206 has counted from 0 to 5. However, the counter continues to count through 15. Decoder output lines 6, 7 and 10–14 are not used. Output lines 8, 9 and 15 are used as additional timing signals. Output line 15 is coupled directly to the K input of flip-flop 202. Output line 15 is also coupled to the clock input of flip-flop 202 via OR gate 203. On the sixteenth count the pulse appearing on output line 15 causes flip-flop 202 to reset, causing the Q output of flip-flop 202 to go low. This in effect disables counter 206 by blocking the signals from oscillator 48 via AND gate 204. Counter 206 remains idle until the next zero crossing pulse from detector 10, which is coupled to the J input of flip-flop 202 via gate 203, sets flip-flop 202 enabling the scanning process to repeat. In this fashion, the output lines of keyboard 5 are scanned once each control interval. Storage register 210 retains the last entered power setting until a subsequent setting is entered. When no actuated key is detected during the scan, the signal stored in register 210 is undisturbed.

D.2 Power Up Flag (PUF)

Storage register 210 has 4 output lines to communicate the state of the contents of register 210 to AND gate 212 and to comparator 214. AND gate 212 tests the contents of register 210 looking for a binary zero (0000) setting representing an OFF power setting. The four output lines of register 210 are connected to the four inverted inputs of AND gate 212. The output of AND gate 212 is connected to the J input of PUF flip-flop 216, a conventional J-K flip-flop. In this fashion, when a binary zero (0000) is entered into storage register 210, the output of gate 212 provides a set signal to PUF 216. The clock input of FF 216 is connected to output line 8 of decoder 208, thereby clocking PUF once each control interval after completion of the keyboard scan and prior to clocking flip-flop 202, not yet described.

D.3 Zero Crossing Master Counter

Zero crossing Master Counter 14 is a conventional 4-bit binary counter, such as the readily available integrated circuit, serial number SN7493. Counter 14 receives zero crossing pulses at its input pin from detector 10. Counter 14 is arranged to function as a ring counter that counts from 0 to 4 for a total of five counts. Upon incrementing to count five in response to the input of the fifth zero crossing pulse, the counter is immediately reset to binary zero. This is done by ANDing the signals from outputs A and C via logical AND gate 235 and using this output signal to reset the counter. It should be noted that the microprocessor version is implemented best by counting from 1 to 5 for five counts while the discrete logic version is best implemented by counting from 0 to 4 for five counts.

D.4 Comparator

As illustrated in FIG. 8A, the four output lines of counter 14 are connected to one of the two sets of 4 input lines of comparator 214. Comparator 214 is a conventional 4-bit magnitude comparator, such as IC circuit SN5485, which makes a magnitude comparison of two sets of four binary inputs and sets one of three outputs corresponding to the three comparison conditions, strictly less than, strictly equal, and strictly greater than. The other set of four input lines is connected to the output lines from storage register 210. In this circuit, comparator 214 is used to test for a less than relationship between the contents of counter 14 and storage register 210. Thus the output of comparator 214 corresponding to the less than condition goes high (logical one) when the count of counter ZCM 14 is less than the contents of shift register 210 M(KB). During Steady State operation the duty cycle is determined by the output of comparator 214 which is gated through to Power On Latch 226 (POL) via AND gate 220.

D.5 Soft Start Operating Mode

It will be recalled that the Soft Start operating mode is implemented when the power setting is changed from an OFF setting to any other setting. When an OFF setting is selected, a binary zero is stored in storage register 210 and PUF FF 216 is set by the logical one at the output of AND gate 212. The output of comparator 214 is ANDed with the output of PUF FF 216 via AND gate 228. The output of AND gate 228 goes high when the output of comparator 214 goes high and PUF FF 216 is set corresponding to YES conditions in Blocks 136 and 138 of FIG. 6C, respectively. The output of gate 228 is connected to the K input of PUF FF 216, the J input of SSL FF 222, and the reset input of counter 230, causing PUF FF 216 to reset, SSL FF 222 to set, and counter 230 to reset when the output from gate 228 goes high, corresponding to Blocks 152, 154 and 156 of FIG. 6C.

It will be recalled that in the Soft Start operating mode, the duty cycle for a five half-cycle control period is 20%. This is accomplished by triggering the triacs only when the count of counter 14 is equal to binary zero, which occurs once every five counts, and when the SSL is set.

Gate 236 ANDs the inverted outputs of counter 14. When the count is zero, the output of gate 236 goes high, which occurs once every five counts. Gate 234 ANDs the output from gate 236 and the output from SSL 222. (When SSL 222 is set the system is operating in the Soft Start Mode.) This corresponds to YES conditions in decision Blocks 140 and 142 of FIG. 6C, respectively. This provides a set signal to POL FF 226, via gate 224, once every five counts when in the Soft Start Mode corresponding to instruction Block 145 of FIG. 6C.

The duration of the Soft Start Mode is controlled by counter 230. Counter 230 is a conventional 4-bit binary counter. The output of gate 234 is connected to the input of counter 230 to increment the counter upon every occurrence of a count of zero, as in Block 144 of FIG. 6C. Counter 230 is arranged to count a predetermined number of pulses from gate 234 and reset. The outputs of counter 230 are connected to the inputs of gate 238, forcing the output of gate 238 to a logical one when the count goes to 5. In this embodiment, the duration of the Soft Start Mode is approximately 664 milliseconds. Counter 230 is incremented by gate 234 once every five clock cycles. It will be recalled that the clock cycle frequency is 120 Hz. Counter 230 resets on the 16th count, which corresponds to 80 clock cycles, thereby providing the required period of 664 milliseconds. The output of gate 238 is connected to the K input of SSL FF 222, causing SSL FF 222 to reset upon the occurrence of the 16th count, thereby ending the Soft Start Mode of operation upon the expiration of the 664 millisecond operating period which corresponds to instruction Block 148 of FIG. 6C.

D.6 Triac Triggering

As mentioned previously, AND gate 220 serves to gate the output of comparator 214 through to the Power On Latch during Steady State operation. Similarly, AND gate 220 blocks the comparator output when in the Soft Start Mode by ANDing the output of comparator 214 with the inverted output of SSL flip-flop 222. The output of gate 220 goes high when the output from comparator 214 is high and the SSL flip-flop is in the reset state, corresponding to a NO output from decision Block 140 of FIG. 6C. The output of gate 220 and the output from gate 234 (the output of the Soft Start Mode) are OR'd together in OR gate 224 and this output is coupled to the J input of POL flip-flop 226. Clocking to FF 226 is derived from count 9 of decoder 208. A high output from POL FF 226 corresponds to instruction Block 141 of FIG. 6C.

The Power Out Routine of FIG. 6D shows decision Block 164 which delays the output of the triggering signal to triac driver 26, until the zero crossing pulse is received. This is accomplished in the circuit of FIGS. 8A and 8B by ANDing the output from zero crossing detector 10 with the output of POL FF 226. In this fashion the zero crossing pulse is used to synchronize the switching of triac 3 with the zero crossing of the power signal.

E. Control of Multiple Heating Elements

Figure 10:
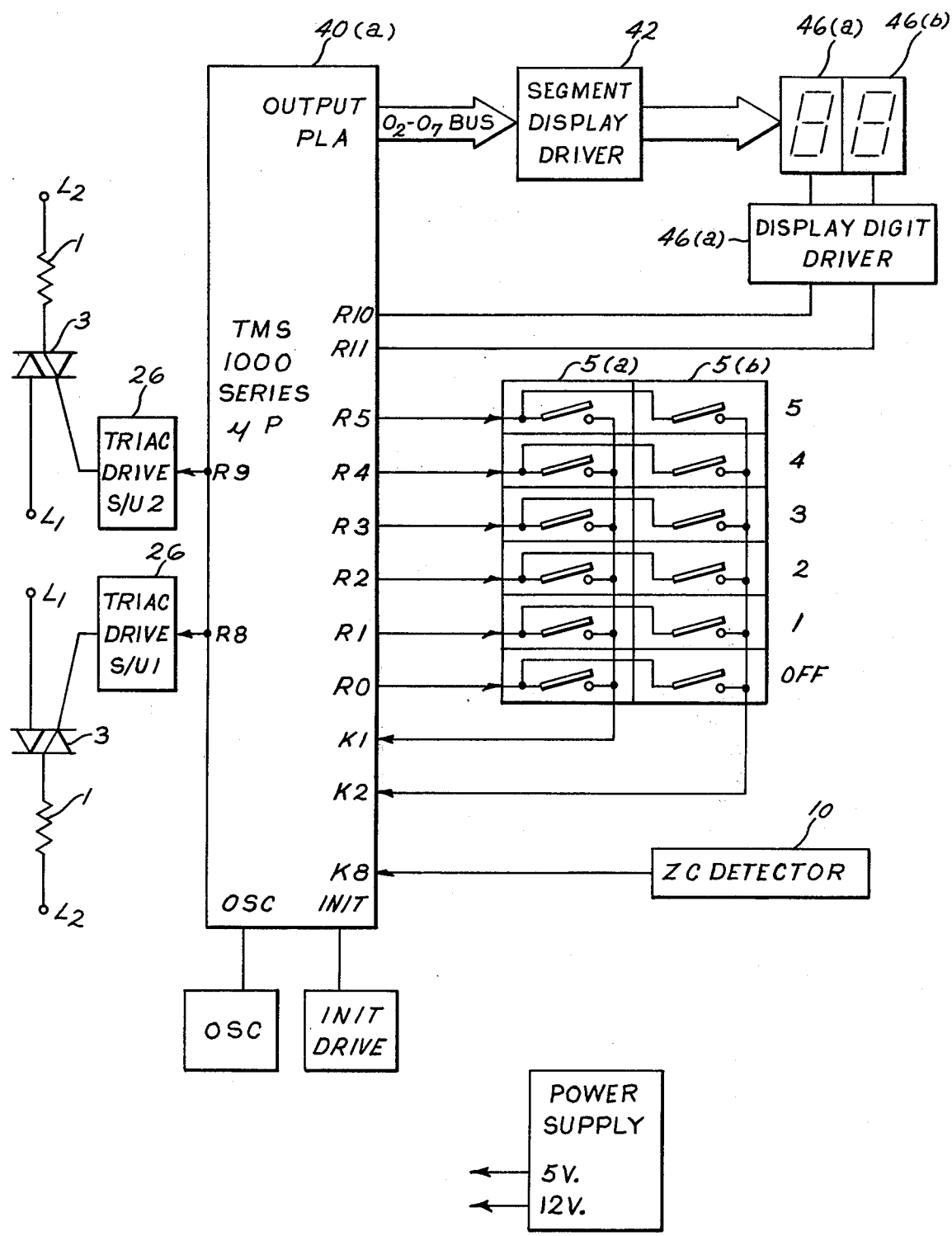
FIG. 10 is a block diagram of an alternative microprocessor based embodiment of the invention usable for controlling two heating elements.

The power control scheme herein described may be readily expanded to the control of multiple heating elements. A microprocessor implementation of the control circuitry for controlling two heating elements using a TMS 1000 series microprocessor is shown in FIG. 10. This circuit differs from that of FIG. 5 in that a second K input, K2, is used for scanning the additional keyboard 5(b). Output line R9 is used as the output line for triggering the additional triac 3 via additional triac driver 26.

Figure 11:
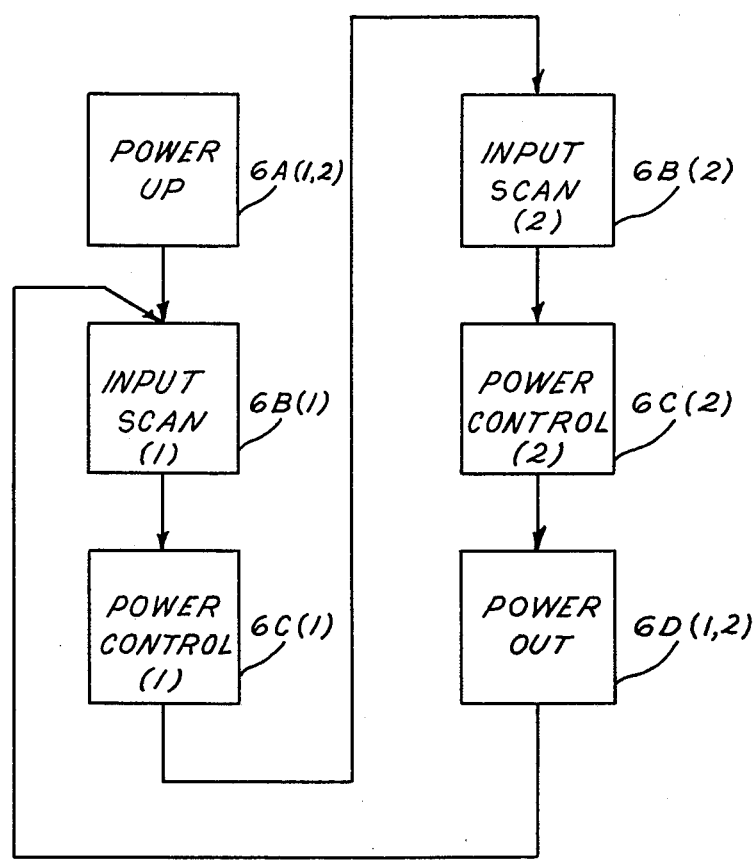
FIG. 11 illustrates the interrelationship of the control routines of FIGS. 6A–6E in implementing the control program for the embodiment of FIG. 10.

The control program for this embodiment essentially comprises the same routine illustrated in FIGS. 6A-6D duplicated for each of the two heating elements. The flow diagram of FIG. 11 illustrates the arrangement of the sub-routines for controlling two heating elements.

Power Up Routine 6A(1,2) is the equivalent of the routine illustrated in FIG. 6A expanded to reset the latches, timers and registers for both heating elements. Input Scan Routines 6B(1) and 6B(2) perform the input scanning functions in the manner of the Input Scan Routine illustrated in FIG. 6B, for heating elements S/U1 and S/U2, respectively. Similarly, Power Control Routines 6C(1) and 6C(2) set or reset the Power On Latches (POL)s for heating elements S/U1 and S/U2, respectively, in the manner of the Power Control Routine illustrated in FIG. 6C.

Power Out Routine 6D(1,2) is identical to the routine illustrated in FIG. 6D except that the display functions illustrated by Blocks 160 and 162 are duplicated for the additional heating element. Similarly, the triac triggering functions of Blocks 166, 168 and 170 are duplicated for the additional heating element, such that a decision is made to set or reset both output latches R8 and R9 (FIG. 10) in this routine immediately following receipt of the zero crossing pulse.

Control of a multiple heating element system using discrete digital logic circuits of the type illustrated in FIGS. 8A and 8B for a single element system, may be achieved by providing a logic control circuit such as shown in FIGS. 8A and 8B for each heating element.

Other modifications and alterations of the invention will become apparent to those skilled in the art from the foregoing discussion and it should be understood that this invention is not limited to the specific embodiments described. It is intended to cover by the following claims all modifications coming within the spirit and scope thereof.

What is claimed is:

1. A power control system for controlling power delivered to a heating element in response to selection of one of a plurality of power control settings including an OFF setting, said settings corresponding to different levels of power applied to said heating element, said element exhibiting a relatively high resistance at high temperatures and a relatively low resistance at low temperatures, at least one of said power level settings operative to deliver power to said element, when at said relatively low temperature, which results in a current level which exceeds an acceptable limit, said power control system including transition detection means operating independently of current and voltage in said element for detecting a transition from said OFF setting to said one power setting, transient control means responsive to said detection means for delivering power to said element for a preselected time at a level lower than that associated with said one power setting, when said transition is detected, said lower power level being sufficiently low that current in the element does not exceed said acceptable limits, and steady state control means for controlling power to said element in accordance with said one setting after expiration of said preselected time.

2. The system recited in claim 1 wherein said preselected time is of sufficient duration to allow the temperature of the heating element energized at said lower level to rise to a temperature at which the current in the element does not exceed said acceptable current limit when said element is energized in accordance with said one selected power setting.

3. The system recited in claim 2 wherein said one setting is operative to apply a first duty cycle power signal to said element, and said transient control means includes means for applying a preselected second duty cycle power signal to said element, said second duty cycle being lower than said first.

4. The combination recited in claim 1 wherein said transition detecting means comprises means for generating a digital control signal representative of selected power settings, memory means for storing said control signals, and means for monitoring the contents of said memory and detecting a change from a control signal representing an OFF setting to a control signal representing said one setting.

5. A power control arrangement for controlling the output power of a resistive heating apparatus energized by a pulsating power supply, in response to a power setting selected by an operator from a plurality of available discrete power settings including an OFF power setting comprising:
- a resistive heating element exhibiting a relatively high resistance at relatively high temperatures, which decreases with temperature to a relatively low resistance near room temperature,
- means for generating a digital control signal representative of said operator selected power setting,
- memory means for storing said digital signal,
- electronic switch means for serially connecting said heating element with said power supply,
- means responsive to said control signal stored in said memory for generating a signal which switches said switch means between a conductive and a non-conductive mode in a pattern determined by said control signal,
- said power settings including at least one power setting operative to apply power to said element at room temperature which would result in current to element which exceeds an acceptable current limit for said electronic switch means,
- means operating independently of electrical conditions in said element for detecting the transition to one of said plurality of power control settings from an OFF setting,
- and means responsive to the detection of said transition for limiting the power to said element for a preselected time to a level sufficiently low to limit current below said acceptable limit in said element, said low power level being applied independently of said selected power level.

6. The system recited in claim 5 wherein said preselected time is of sufficient duration to allow the temperature of the heating element energized at said lower level to rise to a temperature at which the current in the element does not exceed said desired maximum current limit when said element is energized in accordance with said one selected power setting.

7. In a system employing a heating element and operator selectable power control settings including an OFF power setting, said system adapted in normal operation for coupling to a protective means for disconnecting power to said system in response to the occurrence of a preselected threshold electrical condition and wherein said element exhibits a relatively high resistance at high temperatures and a relatively low resistance at room temperature, an improved power control arrangement for preventing the occurrence of said threshold condition comprising means for detecting a transition to one of said plurality of power control settings from an OFF setting independently of electrical conditions in said element, and means responsive to the detection of said transition for energizing said element for a preselected time at a power level independent of said selected power control setting to prevent the occurrence of said threshold condition.

8. The combination recited in claim 7 wherein said means for detecting said transition comprises:
- means for generating a digital control signal representative of said operator selected power settings,
- memory means for storing said control signal,
- means for monitoring the contents of said memory, detecting a change from a control signal representing an OFF power setting to a control signal representing some other power setting, and generating a signal indicative of the detection of such occurrence.

9. The combination recited in claim 8 wherein said means for energizing said element comprises:
- means for applying power to said heating element at a predetermined level independent of said control signal for a predetermined period of time in response to a signal from said monitoring means, and at a level determined by said control signal in the absence of a signal from said monitoring means, whereby a predetermined power level is temporarily substituted for the power level associated with the actual power setting during the brief period immediately following a change from OFF to some other setting.

10. A power control arrangement for controlling the duty cycle of a resistive heating element in response to a power setting selected by an operator from a plurality of available discrete power settings including an OFF power setting comprising:
- means for generating a digital control signal representative of said operator selected power setting,
- memory means for storing said digital control signal,
- a pulsating power supply coupled to said heating element for providing a power signal for energizing said heating element, electronic switch means serially connected to said heating element and said power supply, means responsive to the control signal stored in said memory for generating a signal which switches said switch means between a conductive and a non-conductive mode in a pattern determined by said control signal, test means for monitoring the contents of said memory and generating a signal when said contents represent an OFF power setting;

first latch means responsive to said test means, said first latch means switching to a set state in the presence of said test signal, second latch means responsive to said first latch means and said memory, said second latch means switching to a set state upon the concurrence of said first latch means being in a set state and the control signal stored in said memory representing a non-OFF power setting, said triggering means being adapted to trigger said switch means in a predetermined pattern independently of said control signal when said second latch means is in said set state, and timing means enabled by the set state of said second latch means, and responsive to said trigger means, arranged to count a predetermined number of said trigger signals and reset, said second latch means being arranged to switch to a reset state upon the completion of said predetermined count by said timing means, whereby a predetermined duty cycle is temporarily substituted for the duty cycle associated with the actual power setting when the power setting is changed from an OFF power setting to some other power setting.

11. An electric cooking appliance comprising an operator control arrangement including a plurality of manually selectable power level settings including an OFF setting, a heating element adapted for connection to a household power supply, means operative in response to selection of said settings to apply different steady state levels of power to said element, said element having a resistance which varies greatly with temperature, the resistance of said element at room temperature being such that the application of power to said room temperature element in accordance with at least one of said settings would result in current to the heating element in excess of an acceptable current threshold condition; and a power control arrangement responsive to the selection of said one setting subsequent to the OFF setting independently of sensed electrical conditions in said element for applying a preselected average power level to said element lower than the power associated with said one setting for a preselected time to permit the gradual increase in the temperature and resistance thereof without exceeding said threshold condition, whereby after passage of said preselected time power may be applied to said element in accordance with said one setting.

12. The combination recited in claim 11 wherein said power control means rapidly couples and decouples said power supply to said element.

13. The combination recited in claim 12 wherein said supply is a pulsating supply, and said power control means operates to repetitively segment said pulsations into control periods having a preselected number of said pulsations therein, and to apply a preselected number of said pulsations to said element during each control period.

* * * * *